(12) United States Patent
Catala et al.

(10) Patent No.: US 7,925,526 B2
(45) Date of Patent: Apr. 12, 2011

(54) PRODUCTION MANAGEMENT SYSTEM AND ASSOCIATED WARNING PROCESS

(75) Inventors: Jean-Louis Catala, L'Isle Jourdain (FR); Vincent Lainez, Colomiers (FR)

(73) Assignee: Airbus France, Toulouse (FR)

( * ) Notice: Subject to any disclaimer, the term of this patent is extended or adjusted under 35 U.S.C. 154(b) by 1546 days.

(21) Appl. No.: 11/092,913

(22) Filed: Mar. 30, 2005

(65) Prior Publication Data

US 2005/0228708 A1 Oct. 13, 2005

(30) Foreign Application Priority Data

Apr. 1, 2004 (FR) .................................. 04 03442

(51) Int. Cl.
*G06F 17/30* (2006.01)
(52) U.S. Cl. ........................ 705/8; 705/7; 705/9; 705/11
(58) Field of Classification Search .................. 705/7, 8, 705/9, 11
See application file for complete search history.

(56) References Cited

U.S. PATENT DOCUMENTS

| | | | |
|---|---|---|---|
| 4,803,039 A | 2/1989 | Impink, Jr. et al. | |
| 5,748,495 A * | 5/1998 | Arita et al. ..................... | 702/185 |
| 5,864,784 A | 1/1999 | Brayton et al. | |
| 5,969,697 A * | 10/1999 | Tani et al. ...................... | 345/2.1 |
| 6,047,260 A * | 4/2000 | Levinson ........................... | 705/9 |
| 6,167,320 A * | 12/2000 | Powell ............................. | 700/95 |
| 6,396,516 B1 * | 5/2002 | Beatty ............................. | 715/764 |
| 6,748,287 B1 * | 6/2004 | Hagen et al. .................... | 700/99 |
| 6,853,920 B2 * | 2/2005 | Hsiung et al. ..................... | 702/1 |
| 7,206,646 B2 * | 4/2007 | Nixon et al. ..................... | 700/83 |
| 2001/0034558 A1 * | 10/2001 | Hoskins .......................... | 700/13 |
| 2002/0010519 A1 * | 1/2002 | Watanabe et al. ............... | 700/83 |
| 2002/0065704 A1 * | 5/2002 | Wada et al. ........................ | 705/9 |
| 2003/0117439 A1 * | 6/2003 | Zver et al. ..................... | 345/765 |
| 2004/0100479 A1 * | 5/2004 | Nakano et al. ................. | 345/700 |

FOREIGN PATENT DOCUMENTS

EP 1 139 246 10/2001

(Continued)

OTHER PUBLICATIONS

Watson, Benjamin. Effectiveness of Spatial Level of Detail Degradation in the Periphery of Head-Mounted Displays. Graphics, Visualization and Usability Center, Georgia Institute of Technology. CHI 96, Apr. 13-18, 1996.*

(Continued)

*Primary Examiner* — Beth V Boswell
*Assistant Examiner* — Stephanie Zagarella
(74) *Attorney, Agent, or Firm* — Oblon, Spivak, McClelland, Maier & Neustadt, L.L.P.

(57) ABSTRACT

A production unit for which a schedule of tasks is to be accomplished is prepared and stored in a central management device. The unit includes individual electronic devices, control stations, and a network linking the individual electronic devices and the control stations to the central management device. Each individual electronic device includes a device to input the tasks accomplished and problems encountered and further includes a transmission device for information input. The central management device compares data received with the schedule of tasks, generates a warning signal when the comparison detects a gap or discrepancy between the data received and the schedule of tasks, and transmits the warning signal to the individual electronic devices and control stations. The individual electronic devices and the control stations include a device to display the warning signal.

14 Claims, 6 Drawing Sheets

FOREIGN PATENT DOCUMENTS

JP    06103011    4/1994

OTHER PUBLICATIONS

Watson, Benjamin. Managing Level of Detail through Peripheral Degradation: Effects on Search Performance with a Head-Mounted Display. ACM Transactions on Computer-Human Interaction, vol. 4, Dec. 1997, pp. 323-346.*

Microsoft Encarta Online Encyclopedia (Deluxe 2000) and Standard 2002 Reference Library. Retrieved Dec. 3, 2009.*

* cited by examiner

PRODUCTION MANAGEMENT SYSTEM AND ASSOCIATED WARNING PROCESS

CROSS-REFERENCE TO RELATED APPLICATIONS

This application claims priority to French Application No. 04 03442, filed Apr. 1, 2004, the entire content of both of which is hereby incorporated by reference.

BACKGROUND OF THE INVENTION

1. Field of the Invention

This invention involves a production management system in a production unit and a corresponding warning process.

2. Discussion of the Background

This invention applies to any production unit managed through a schedule of tasks to be performed, also called work or planning schedule. Its purpose is for each task to be performed to determine the chronological order of performing these tasks as well as a starting date and a completion date for each of them. These tasks can be very numerous and involve a large number of individuals. For instance, this is the case for aeronautical, space, naval construction but also for the construction of a plant, a building, etc. As such, preparing a work schedule has become a true science. Undoubtedly the best known method to establish such work schedules is the critical path method, commonly known as PERT (Program Evaluation and Review Technique).

Such work schedule preparation methods permit upstream management but do not provide the means to avoid, or at least limit, deviations with respect to the initial schedule during production.

When a technical problem occurs during the performance of a task, this problem is handled by the individual who discovers it. For instance, this person notifies the applicable supervisor. According to the importance of the problem, the information is then retransmitted to a methods office that provides for technical support for all or a part of the production unit and/or the office that designed the piece or the assembly, for which the technical problem has appeared. Once the solution has been found, it is retransmitted to the level of the mounting station and the technical operation for which the problem surfaced, can now be performed.

To enable a production follow-up, computer or manual inputs of starting and completion dates of the various tasks, technical problems that may be found, solutions found can be performed. Then, it is possible, at the level of the production management department to view and edit on paper all information input.

In spite of the implementation of modern communication means (phone, email, . . . ) that permit quick transmission of information, one observes that information transmission times are relatively long within a given production group and can be damaging, especially when the problem occurs during a task that is located on the critical path of a work schedule.

SUMMARY OF THE INVENTION

As such, the purpose of this invention is to provide a system that permits accelerating the transmission of all information involving any problem that takes place during the execution of a planned task on a work schedule so as to delay the applicable production as little as possible.

For this purpose, the system proposed is a production management system for a production unit for which a schedule of tasks to be accomplished is prepared and stored in a central management device comprising individual electronic devices each associated with an operator, control positions comprising input and display means and a network that links these individual electronic devices and the control positions to the central management device, for which the individual electronic device includes on the one hand, means for inputting the tasks performed and problems that may have been encountered during the performance of these tasks by the associated operator and on the other hand, transmission means for the information input to the central management device, and in which the central management device includes means for comparing the information received from the various individual electronic devices with the schedule of tasks to be accomplished stored in memory.

According to the invention, the central management device includes also means for triggering a warning when the comparison means have detected a gap between the information received and the schedule of tasks to be accomplished that exceed a predetermined and stored threshold, as well as transmission means of such a warning to the individual electronic devices and the control stations, and one part at least of the individual electronic means and the control position comprise display means that permit viewing and displaying the warning signals involving not only the associated operator to the individual electronic device or to the control position but also other operators and other control positions.

Such a system permits circulating information throughout a production unit. Information is then available to each one as well as at numerous geographic locations of this unit. As such, a person who is not at his station can also be informed. Moreover, this system permits real time information from all interested participants, or at least, from a portion among them.

Other warning signals can be generated by the central management device. As such, one can anticipate that when a task must start subsequent to another, as soon as the first task is done, a warning is triggered by the central management device. Warnings can also be generated when a technical problem, a missing piece or part, a quality problem, etc. is signaled.

In this system, the individual electronic devices are preferably wireless, portable devices of the portable computer type. In this way, they can follow the operator and the latter is not obligated to return to a predetermined location to check information or to input information. Such devices, which can be qualified as nomads, thus follow the operator in the same way that for the state of the art, the scopes followed him to his work place. These nomad devices are in size adapted to the tasks assigned to the operator. For instance, they can have the size of an electronic notebook or agenda if it is preferred that the operator slides it in his pocket or else, the size of an electronic panel if technical drawings must be displayed for instance. One can also provide for a stationary base and a screen, preferably interactive and mobile. The screen can also be a fixed screen.

For more interaction and for making the system dynamic, the central management device includes beneficially inputting means that permit modifying the stored task schedule. On the basis of an observed situation ahead of schedule or behind schedule, the task schedule can be adjusted to the new situation.

To improve communication and the broadcasting of information, the system also includes, for a preferential performance mode, at least one screen, beneficially with large dimensions, associated with display means and linked to the network. Such a screen, when placed in a pass-by location, at the "center of gravity" of the production group involved, permits broadcasting information to all individuals who check it. Such a check can then take place automatically when passing by the screen. This permits everyone, people of the production group involved as well as people outside this group, to know about the progress of the work.

So that the display on this screen is always up to date, the display means include scroll down means of an image illustrating the task schedule. Here for instance, one can think of a cursor that is moving around on the screen or a fixed cursor and a task calendar that scrolls down behind the cursor. To adjust to the time that is elapsing, the display means are two-dimensional display means and for one of the two dimensions, the scale used is changing. The dimension presenting a variable scale is preferably the dimension associated with the time line or axis. One can foresee that the variable scale is optimal at the center of the screen and decreases towards the edges of the screen. If the variable scale involves the time line or axis, then the actual tasks are represented on a large scale and the tasks, past and future, are represented at a reduced scale. Then, this permits a better legibility of the screen, and brings the present information to the foreground and enhances it with respect to the rest of the information.

In the event that the warning system according to the invention includes a screen and display means, then the latter permit beneficially the display of a cursor and are associated with a displacement control device of this cursor, such as for instance a computer mouse. Such means permit interaction between the screen and an operator. As such, for instance, if the warning system also includes additional information display means when the cursor is positioned on an area of the screen, the operator can require additional system information with respect to the information displayed.

This invention also involves a warning generation process during the performance by operators of planned tasks on a task schedule, characterized by the fact that it includes the following stages:

- preparation and memorization in a central management device of the tasks schedule;
- circulation through a network to each operator of the tasks to be accomplished;
- input by each operator of the tasks that he is performing and possible problems encountered;
- transmission through the network of the information input by each operator to the central management device;
- comparison of the information received with the memorized task schedule and detection of faults and problems that my hamper the proper performance of the tasks;
- generation of a warning when a fault or problem is detected;
- circulation throughout the network of the generated warning.

Such a process can be implemented using a system such as described above. This process permits facilitating communication within a production group and as such limiting delays that may occur during manufacturing. This process also permits optimizing production and limiting the duration thereof. As such, considerable time savings may be realized.

Beneficially, all of the warnings generated are displayed on a large sized screen near several work stations. In this way, everyone passing by this screen can be informed of the ongoing warnings. If this person is involved, he/she can act immediately. For greater efficiency, the tasks to be accomplished by all operators are displayed on the screen. An overall view of the activity of the production group is then shown on the screen.

As suggested above with respect to the system described, the screen displays for instance a diagram for which a line or axis represents the time line or axis, and a cursor moves on the time line to position itself automatically on the present date and time. The cursor can remain considerably immobile and be considerably centered on the screen while the time line adjusts itself to the cursor position. On this time line, the scale is variable, for instance.

In a process as described above, the warnings for instance take on the form of visual signals that appear on the display means.

When the tasks to be performed by the operators are displayed on the screen, one can provide that several tasks are grouped in a family of tasks and that each family of tasks is displayed on the screen, without the tasks of such a family displayed being displayed any longer individually. This is particularly beneficial when the number of tasks to be managed is large. In such a case, one can have a more synthetic view of the tasks.

For an even greater synthetic view associated with several production groups, one may consider displaying tasks or families of tasks for various task schedules simultaneously on one and the same screen.

With respect to the display, it can also be considered that general information involving tasks displayed be grouped in a banner displayed on the same screen. Preferably, task progress indicators are calculated and displayed on the banner. Such a banner is then a very useful tool for piloting tasks involved.

To better manage information collected during the implementation of a process according to the invention, one can beneficially provide that the stored and input data are analyzed and processed by a spreadsheet then issued or output in the form of graphics. Such analyses and outputs permit anticipating problems better, better piloting tasks during their performance and also permit downstream to analyze possible dysfunctions so as to take them into account for a next manufacturing cycle.

BRIEF DESCRIPTION OF THE DRAWINGS

Details and advantages of this invention will follow from the description below, referenced against the attached drawing on which.

DESCRIPTION OF THE PREFERRED EMBODIMENTS

This invention is described here with reference to an aircraft assembly line 2. However, it can apply to numerous other fields. As non-limiting examples, this invention can also be applied to naval construction, construction of satellites, machine tools, buildings, plants, works of art (bridges, roads, etc.).

Figure 3:
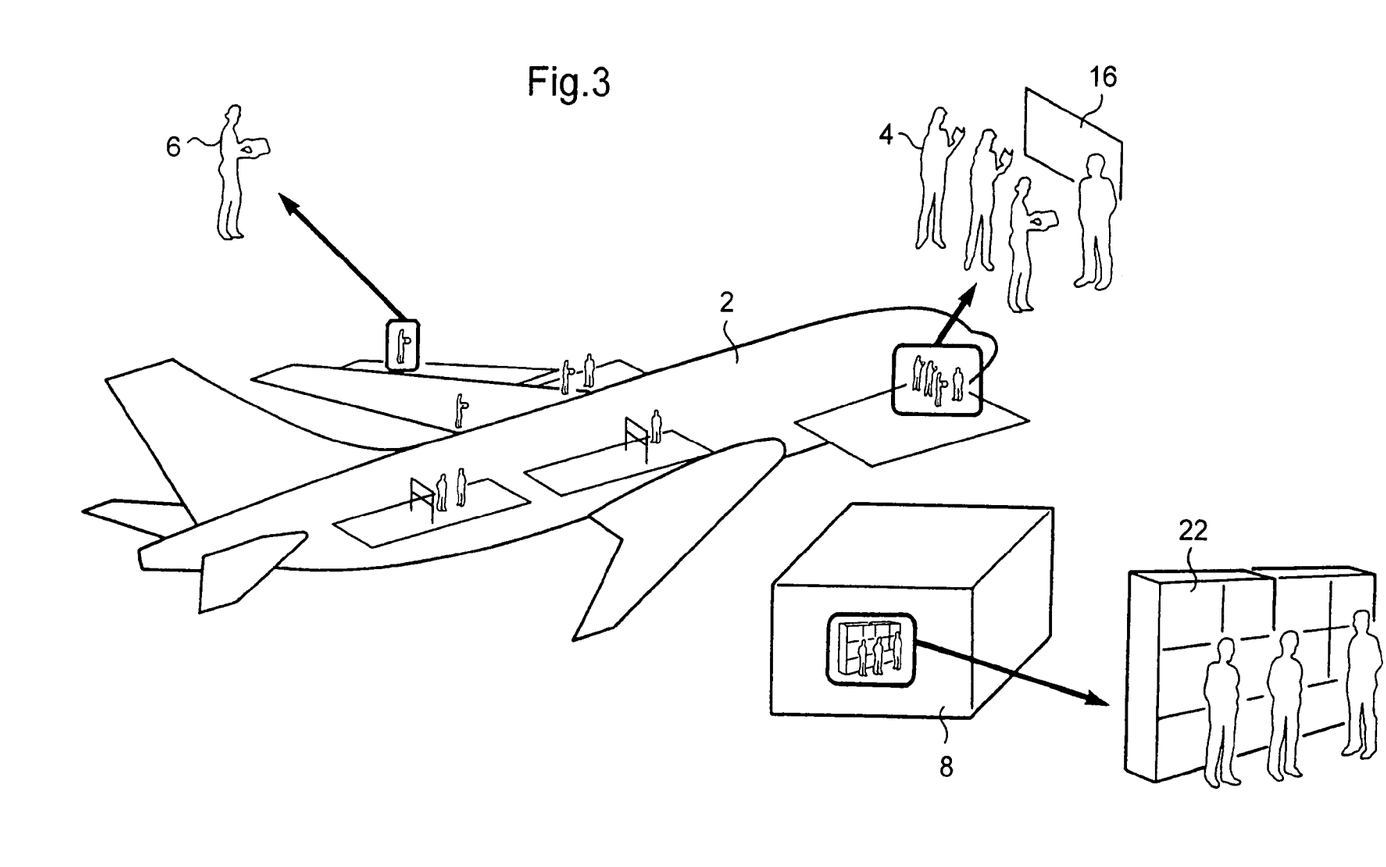
FIG. 3 shows an assembly shop of an aircraft when such a process is implemented.

FIG. 3 shows aircraft 2 in an assembly hall.

Several production groups are scheduled for assembling the aircraft. One production group for instance is scheduled for assembling sections of the aircraft and another one for installing electrical wiring. Each construction group is made up on the one hand of an assembly team 4 that includes several manufacturing agents 6 around the aircraft 2 for the performance of a predetermined task and on the other hand, technical support 8 that includes individuals assisting the manufacturing agents 6 with their work. Individuals who represent technical support 8 are represented in a room outside the assembly shop, near aircraft 2. For instance, they are supervising the quality of the work of the manufacturing agents 6 during the performance of their tasks by checking among other, the work done by assembly team 4. Technical support 8 includes for instance also a technical support that provides technical assistance of the applicable production group and a logistic support managing the supply of parts necessary to perform the operations of the manufacturing agents 6.

Balancing a production group is a tool that is aimed at scheduling as much as possible the tasks, or operations to be performed, and this on the basis of the cycle, work force, stresses and resources available. This scheduling of tasks is indispensable for optimizing the use of human and material potential, for obtaining a regular and stable production flow, for reducing manufacturing cycles for the products, for helping to plan work loads and determining manufacturing times, for providing the work force to be hired, for avoiding the saturation of positions in terms of means and employees, for informing the shop of the start of the operations to be performed through the transmittal of graphs, for coordinating this work of the various assembly teams and for following the progress of the work.

This balancing is then the graphic representation of a set of tasks forming an assembly station or similar for a given production cycle or interval. An assembly line is made up of a certain number of assembly stations located at well-defined physical positions for aircraft 2. An assembly station corresponds to a sum of operating ranges that are performed by an assembly team 4. Each station is associated with a certain number of tasks to be performed within a given period of time which is called the production cycle or interval.

Tasks to be performed for assembling an element, an aircraft, etc. . . . are defined within their operating ranges or scopes and their operations. A range or scope is defined by a data assembly, for which the most important ones are: its reference that identifies it uniquely, its title that describes it summarily, its charge at the reference rank (rank 100), its decreasing coefficient and one or several production groups.

Time constraints among tasks can be defined. As illustration examples, one can as such have mutual exclusion constraints between two tasks, priority (or succession) constraints, fitting constraints which imposes a task to start (or to end) exactly at the same time as another, or else, to start as soon when another tasks is completed.

Performing a balance must take into account the various resources available and necessary to the performance and management of a task. Among these resources, there are also the manufacturing agents 6 needless to say. Each belongs to a trade (for instance, assembler, fitter, electrician, . . . ). One and the same manufacturing agent 6 can have one or several skills or qualifications. There are also the means that are devices, infrastructures, tools in the general sense required to perform a task. Finally, one must take into account the geographic areas of a station that are in general ground surfaces that can be free or occupied by a tool and product areas that are geographic product spaces (an area in the aircraft, for instance). An area can have a maximum capacity in terms of the number of manufacturing agents or means that can occupy it for a time span. It can be declared a forbidden area during the performance of a task, which implies that it is forbidden to assign a manufacturing agent to this area during the performance of another task.

There is no exact mathematical law to establish a balance. It is done by traditional methods based on human experience. To achieve a balance, one must establish the list of tasks that will be performed at the assembly station in question, define the man power by trade required at the assembly station, determine the scheduling of these tasks, by assigning to each one or several manufacturing agents, while observing a proper quality work organization, assign resources, distribute the tasks in the various assembly stations of the assembly line and finally represent graphically the scheduling of the tasks by creating a GANTT diagram (after the name of Henry L. Gantt: it permits representing the needs of a project in resources on the basis of time through a list of tasks represented by horizontal bars). The technique known as PERT (Program Evaluation and Review Technique) can be used here.

Figure 4:
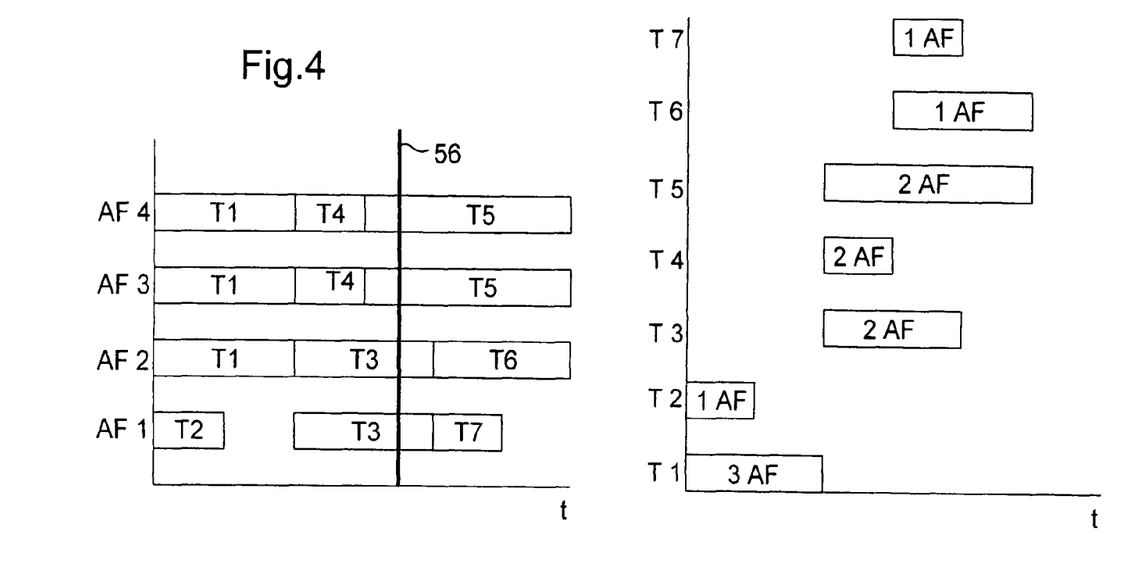
FIG. 4 shows an example of balancing.

As an example, FIG. 4 shows a balance for seven tasks distributed among four manufacturing agents. The diagram on the left of this figure indicates for each manufacturing agent the tasks that he must perform and the diagram on the right shows the distribution of the tasks in time while specifying the number of manufacturing agents required to perform each of the tasks.

Figure 1:
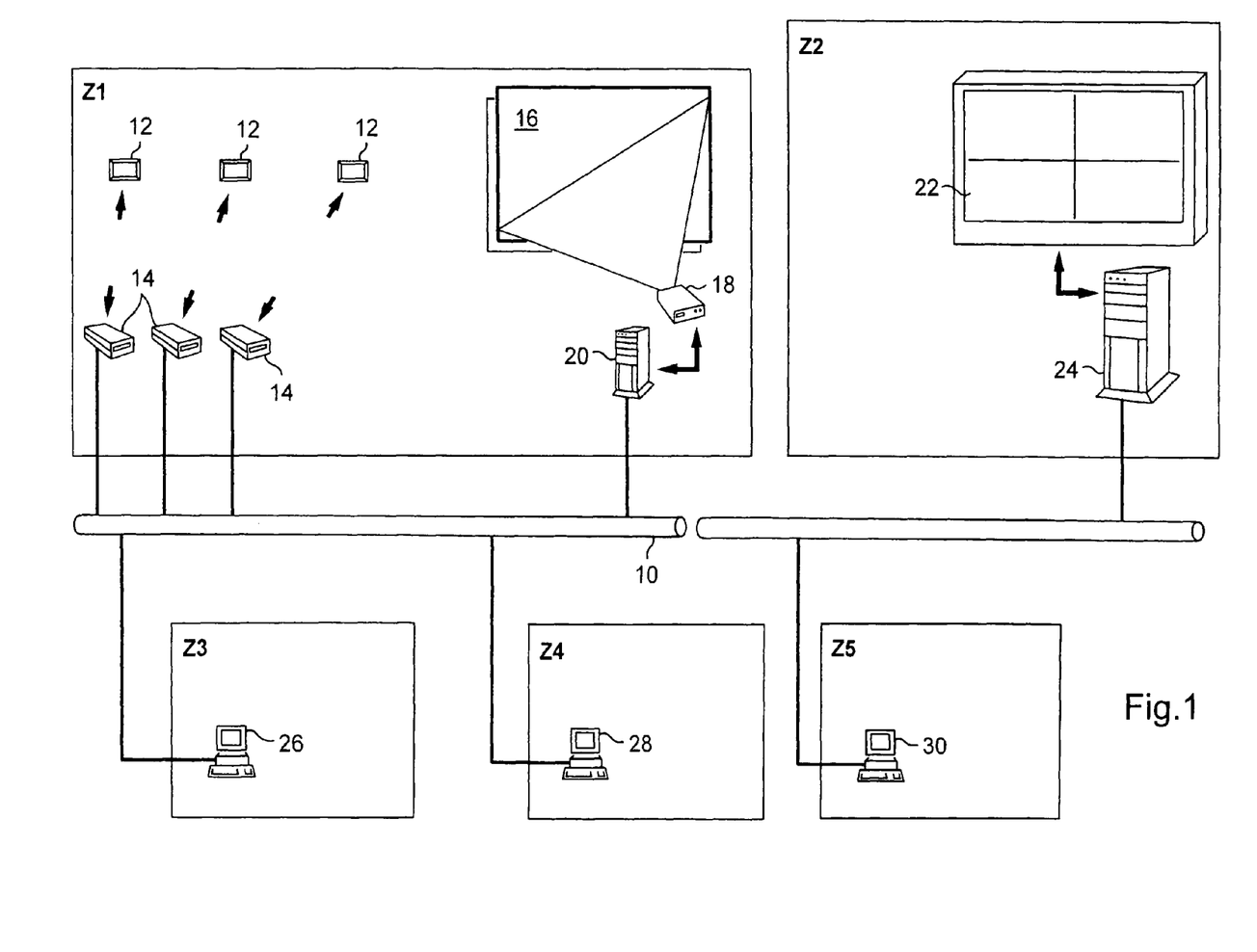
FIG. 1 represents a system according to the invention.

FIG. 1 shows a system according to the invention aimed at managing production in the assembly shop described above. This system is represented on this figure according to the production areas in which it is located. The various components of this system are linked among each other by a network 10.

In assembly area Z1, manufacturing agents 6 are working. Each manufacturing agent has available an offline screen 12 linked through a wireless connection to a central unit 14, which itself is connected to network 10.

Each manufacturing agent must find on his offline screen 12 the information that he needs to perform the task assigned to him. As such, he can read on this screen, the balance indications that apply to him.

The manufacturing agent receives as such information but he is also required to inform the system about the progress status of his task. In real time, he indicates as such the date when he starts his task and then when he completes it. He must also input any technical problem that he encounters and notify as soon as he is missing a part or a tool required to accomplish his task.

The technical means made available here to the manufacturing agent can be diverse. For instance, it can involve a portable computer linked to the network by a wireless link, preferably. This tool permits receiving and sending information. Also, it may only be a mobile screen (wireless) associated with a fixed base (connected by a wire to the network). The screen can be an interactive screen that permits the inputting of data or else, the screen is only used for reading information while data are input by the manufacturing agent at the fixed base level. The size of the screen can be selected according for instance to the task being accomplished by the manufacturing agent. If the latter moves around a lot, a pocket-size format is preferred. On the other hand, if he performs his tasks while essentially staying at the same location, a larger sized screen, and as such more comfortable, is preferred and is then located near the manufacturing agent.

In assembly area Z1, there is also a giant screen 16. A video projector 18 controlled by a central unit 20 linked to network 10 makes the display on giant screen 16, such as the balance of the production group to which belong the manufacturing agents working nearby. This giant screen 16 is positioned at a walk-by location so that it is visible to all. This screen is preferably of a large size, for instance 4 m×2 m, so that on the one hand, a lot of information can be shown at a time and on the other hand, so that this information is easily legible. The size of the screen is adjusted to the amount of information to be displayed. For certain applications, average size screens (30 to 40") or classic sizes (less than 30") might be considered.

Technically speaking, this large screen 16 can for instance be a wall of images. It can consist of several screens side by side so that they form a larger screen. However, for better legibility, it is preferable to have a single screen. LCD technology may also be considered.

Next to assembly area Z1, there is an area Z2 for the technical supports 8. In this area Z2, there is a control screen 22 that is for instance an assembly of four plasma type screens, and for which the display is controlled by a central unit 24 linked to network 10.

FIG. 1 also shows three other areas Z3, Z4 and Z5 that coincide for instance with three levels of hierarchy. Area Z3 for instance may be assigned to the production group manager, area Z4 to the unit manager for several production groups while Z5 is for the plant manager. At all these levels, there is each time at least one computer 26, 28 and 30. Each of these computers is linked to network 10 and can receive as well as transmit information.

FIG. 2 shows again areas Z1 to Z5 of FIG. 1 with the various components shown on this figure. This figure also shows schematically the various devices that permit managing this system so as to promote communication between the various users of this system. This improved communication must permit arriving at a greater performance in production. The system must also replace to a large extent the information exchanges that until now took place in hard copy (paper).

Figure 2:
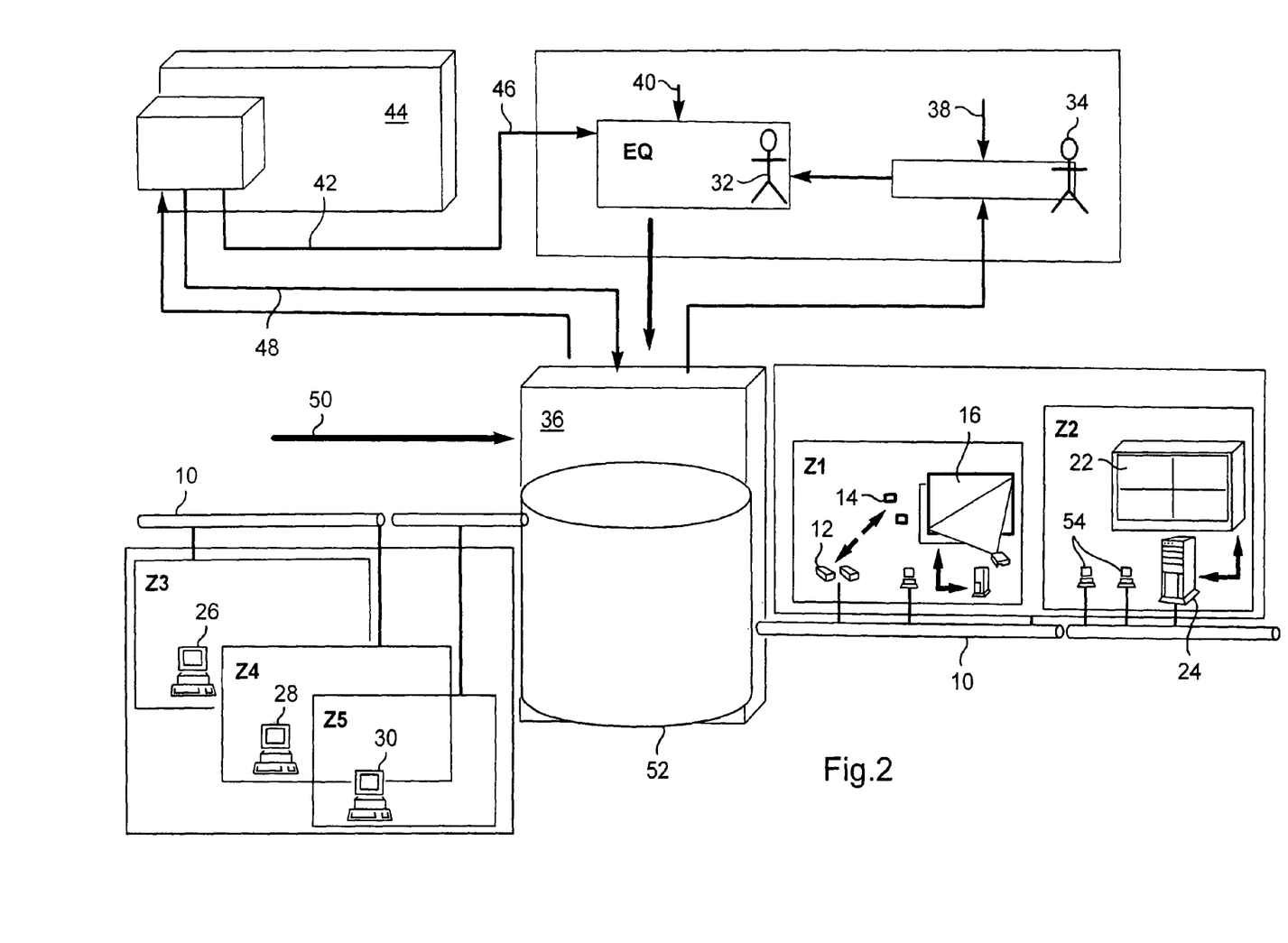
FIG. 2 illustrates through a diagram, a process according to the invention.

At the center of this system and the associated process is the creation of the balancing activity. Essentially, this takes place manually, using information tools for its presentation but not for its design. Work study agents 32 perform this EQ balancing activity.

Information of all kinds is required to perform this EQ balance. Before doing it, work study agents 34 first find out the progress status of the construction of aircraft 2. As such, they receive information from the central management device 36 that centralizes the various data transmitted, for instance, by the manufacturing agents of area Z1 as described below. The work study agent 34 can possibly also obtain data 38 from other sources.

Knowing the progress status of the construction of aircraft 2, work study agent 32 then prepares the EQ balance using resources that he has available and constraints linked to the construction of the aircraft.

Resources 40 are associated for instance with the expected work force of manufacturing agents and the availability of the various tools, production schedule, PERT diagram for the construction of the aircraft, etc.

Constraints are either so-called "in-house" constraints 42 that involve information obtained by management system 44 of the company, or "outside" constraints 46 that are for data not managed by management system 44. Among these various constraints, one can mention work performed by subcontractors, the status of deliveries by suppliers and also all work performed by other production groups within the company.

The main management device 36 of the system receives the EQ balance performed by the work study agent team 32. This EQ balance is for this device a key component. It is prepared for an assembly phase before the performance of this phase and as such represents a static component even though, as described below, the process according to the invention permits making it more dynamic.

To be able to adjust this balance, the central management device 36 receives in real time data 48 from management system 44 of the company, data 50 involving available resources (work force, skills, etc.) and constraints such as the production schedule. Network 10 also supplies important data to the central management device 36. All this information is stored in a database 52 associated with this device.

Central management device 36 compares information or data that it has with the EQ balance that it has received. To the extent that the information received coincides with the information expected taking into account the EQ balance, central management device 36 does not act. On the other hand, when data that it is receiving, show a problem that risks causing a delay in the completion of the managed assembly phase, a warning is sounded. Central management device 36 has in memory the allowable delays for the various tasks. One must prevent triggering a warning if the delay is just a few minutes. The allowable delay depends among other on the task and its position in the balance. The tolerance is evidently much less for a task that is on the critical path than for another task.

The principle is to have this warning known at all levels of the assembly shop. A particular warning is triggered for the person who has to solve the problem leading to the warning by display on his computer or his display screen of a special message. The warning is also given by a visual message. Needless to say, it is also possible to provide for an audible warning. The warning also appears on giant screen 16 and on control screen 22. As such, any person passing by giant screen 16 is potentially made aware of this warning. If involved, this person can also be informed if hw/she is not at his/her work station. This management of warnings is described in the remainder of the description.

As indicated above, each manufacturing agent has a "terminal" that enables him on the one hand to view information sent to him and on the other hand, to inform the system about the progress of his work. First of all, the manufacturing agent must identify himself. This identification is preferably simple. For instance, it includes his ID number or another identifier. After identifying himself, the manufacturing agent must hook up to the system and receive the information addressed to him. Until now, this information was mostly passed on to him in hard copy. As such, he is aware of the task that he must accomplish, as scheduled by the balance. The manufacturing agent indicates that he is starting or finishing an operation. For long operations, stages may be indicated or a percentage of the overall performance. The manufacturing agent also inputs at this terminal any technical problem that he encounters. This input is important later on at the level of tracking construction of the aircraft but above all for being able to generate a warning and notify applicable technical support 8 immediately. Likewise, if a piece or part required to perform the assembly is missing, this is indicated in the system through an input by the manufacturing agent. A warning is then generated at the Purchasing manager's station and possibly to the manager of the production group (area Z3). If a problem involving the quality of the work occurs or is found, a warning is also triggered by the manufacturing agent.

In area Z2, technical support 8 has a control screen 22 enabling it to follow the actions undertaken at the applicable production group level. Computers 54 are available in this area Z2 and offer several functions. First of all, these computers 54 enable people that provide technical, logistic and quality support to identify themselves to the system. One and the same technical support team may be available to several production groups. As such, it must work on several balancing activities. Consequently, it is possible to select a specific balance for a production group. Technical support can then manage the daily cutout for this balance. When technical support is assigned to conduct quality control operation for tasks performed by manufacturing agents, task validations can be managed from computers 54. At this level, it is also possible to manage man or material resources. A manufacturing agent of a manufacturing group can for instance be "loaned" to another manufacturing group according to the skills required by these production groups. As far as warnings are concerned, on the one hand, one can create them from area Z2 when, for instance, a quality deficiency is observed, and on the other hand, to manage them in cases, for instance, where a technical, supply or quality problem has been solved. A warning generated at the level of area Z2, for instance, can also be forwarded to a higher (or lower) level of hierarchy.

Large screen 16 places a pivotal role in the circulation of information within a production group. The various users (manufacturing agents, technical support people, product group manager, unit manager and possibly the plant manager) can consult it for information.

The purpose of this large screen 16 is to represent electronically a graphic assembly showing the tasks assigned to the product group agents. This display also represents an interactive communication and collaboration support between manufacturing agents and associated technical support agents. This permits obtaining with the rest of the system, a greater performance in production by facilitating exchanges within the production groups for settling technical and logistic problems. Moreover, due to its large size, this display is user friendly and esthetic. This large screen 16 that permits an overall view of the assembly operations can also give an overview of the progress of the work to customers coming to look at the assembly of an aircraft that they have ordered.

Large screen 16 displays lines, each of which associated with a manufacturing agent according to the assignments made by the work study agents 32. The number of lines corresponds to the number of manufacturing agents working in the applicable production group. A task can be divided among several manufacturing agents and can also be distributed over time. Tasks are positioned according to their dependences, represented in the form of PERT diagrams.

On the horizontal axis, large screen 16 represents time bars for the tasks as well as text that go with them, over a relatively long period of time to have a better overall view.

The display on large screen 16 is dynamic. A cursor 56 (FIG. 4) indicates continuously the time that has elapsed. The cursor moves with time. The position of cursor 56 permits estimating the overall progress with respect to the balance.

Figure 5:
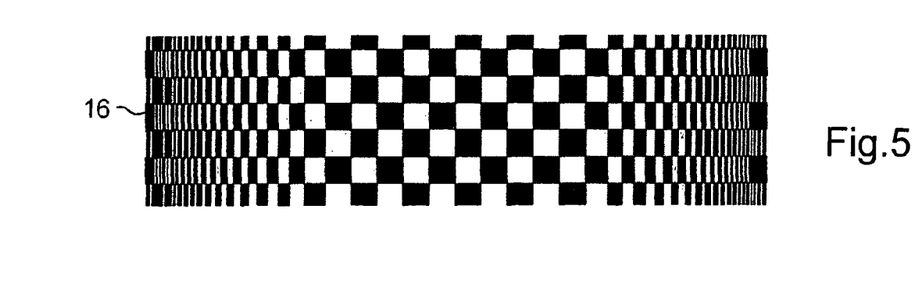
FIG. 5 shows schematically a type of large screen display.

As a performance variant, one can show on the screen a variable scale on the time axis or line (horizontal) as schematically illustrated on FIG. 5. At the sides of the screen, the scale is smaller and it is optimal in the center of the screen, at the abscissa corresponding to the date where it is located. The more one moves away from this date, the smaller the scale becomes. The decrease of the scale can be linear. With such a display, one can provide that the cursor is considerably immobile at the center of the screen, except at the beginning and the end of a balancing activity. As such, the display is compressed on the sides (vertical) of the screen.

For this variant, a preferred form of performance provides that the display is broken down in three horizontally divided areas. The central area is so-called non-deformed, with a maximum scale on the time axis or line. The two peripheral areas represent a distortion on the time axis or line (horizontal) and no distortion in the other direction (vertical). The central management device 36 assures the connection between the distorted areas and the central area. Such a representation has the advantage of representing at any given time all of the balance. Computation of compression is mathematical and is based for instance on the projection equations of a sphere on a drawing. This compression of the sides can also be based on a logarithmic function.

Large screen 16 also shows for each of the tasks represented whether this task is inactive, open, advanced (with possibly the progress percentage), completed or checked.

Warnings must also be represented on large screen 16. They must be individually visible on this screen. For instance, they can be animated and show an oscillating movement. Since tasks are arranged next to each other horizontally, such movement is preferably a vertical movement. As such, a warning for a task does not affect the display of neighboring tasks.

To distinguish the various warnings, for instance, one can choose a specific color for each: red for instance is for technical warnings and yellow for logistic warnings. If two warnings of a different type occur for one and the same task, one can provide that the color of the oldest warning remains.

A warning can be triggered by a manufacturing agent or a technical support agent. Information about the warning is its type, status and possibly the date when it was triggered and the person by whom it was triggered. After having been triggered, a warning is taken into account, and then solved.

Display on a giant screen can also denote the critical path. Tasks located on this critical path can be identified by a particular color for the tasks located on this path. A control device can also be provided to vary the display. The critical path is then displayed for instance when the display is tipped on an overall view of the balance (without distortion).

The central management device 36 operates through a software that includes static visual components, dynamic visual components and functional components.

Static visual components are for instance deduced from hard copy presentation of the balances of the previous state of the art. These components denote for instance tasks, individuals, presentation components, etc.

Dynamic visual components are specific and do not exist in the previous state of the art. This involves for instance various dialogue boxes developed at the level of the terminals of the manufacturing agents and of the technical support agents, mobile cursor, warnings, etc.

The functional components link among each other the visual components but do not appear at the system interface level. These components are for instance a session manager, a time manager, a styles manager for the various graphic configurations, a software bus to communicate with the various applications, an animation engine, a positioning system, balance views, containers for components and individuals and phases that regroup the graphic components among each other.

The session manager is responsible for storing the users sessions in memory. It is modified by connection and end-of-connection dialogue boxes. It conditions the display of the input interfaces of the manufacturing and technical support agents.

The time manager can set up a schedule on the basis of the various parameters which are here, for instance, a starting date, a total duration and available steps. It also manages clock signal at given intervals (for moving the cursor for instance).

The style manager permits displaying static and dynamic graphic entities on the basis of a resolution, a type of application and a mode of display.

The animation engine assures displaying active warnings and dialogue boxes. It permits creating complex links involving geometric transformations or paths of the components displayed.

The positioning system manages the placement of the task components and navigation in the balance. Each view contains a positioning system.

The software bus supports a communication protocol between the various applications based on text message exchanges, distributed to dynamic components.

The assignment assembly of the work force affects the contents of the lines together with the time manager to display the name of the manufacturing agent for to the time window in which he is located.

Interfaces for manufacturing agents and technical supports affect the display of the task components.

Finally, the balance is the root component that makes the various views coexist.

FIGS. 6 to 9 illustrate the display examples on large screen 16. Needless to say, displays as described below can also be achieved on other screens.

On large screen 16, in general, one represents one task per screen line. In some cases, the number of tasks to represent is great. Then, to permit a more synthetic view, it is suggested to regroup several tasks in a family. All tasks of the same family will then be represented on the same line. Each balance task is generally associated with a manufacture order number. A family is then associated with a manufacturing order assembly. This task grouping is done according to technical and time considerations or linked to the assembly area in question.

Figure 6:
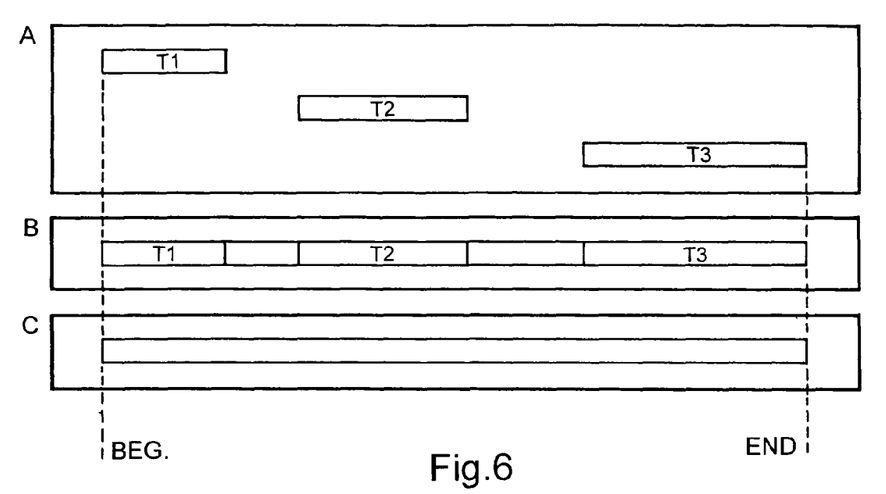
FIGS. 6, 7A and 7B, 8 and 9 illustrate various displays that can be implemented on a screen.

FIG. 6 illustrates the place gain obtained with the creation of families. On part A of FIG. 6, three tasks T1, T2 and T3 are shown. According to the balance, task T1 starts at date BEG, is performed before tasks T2, which itself is performed before task T3 that is completed by date END. As an example, in the aeronautics field, task T1 involves for instance the installation of a front landing gear; task T2, installation of a right landing gear and task 3, mounting of a left landing gear. Then it is decided to create a family covering the mounting of landing gears. This family, represented on part B of FIG. 6, includes tasks T1, T2 and T3. To have a more synthetic view, the family of tasks is shown on giant screen 16 as a single task for which the beginning is scheduled for date BEG and the end for date END.

Figure 7A:
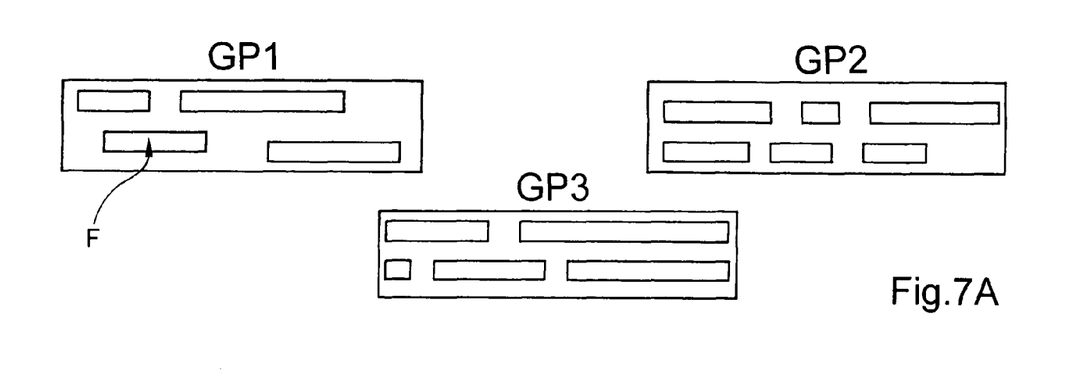

To obtain an even more synthetic view of the mounting area, it is proposed to regroup several families inside a production group. FIG. 7A thus illustrates for instance three production groups GP1, GP2 and GP3. For each of these production groups, there are several families F. For instance, it is assumed that these three production groups correspond to an assembly area. Then, one can provide for large screen 16, to have a display per production group as illustrated on FIG. 7A or one can also provide for a synthesis screen (FIG. 7B) grouping the various assemblies of families contained in a balance for one and the same area of assembly. With such a synthesis screen, the production manager responsible for the assembly area can see the status of the three production groups at the same time. This display is not a detailed display but permits providing the production manager with a good synthetic view of the work in the area for which he is responsible. While in general, a giant screen 16 is foreseen for each production group, here, punctually, one can synthesize information or data for three (or two or more) production groups.

Figures 7B, 8:
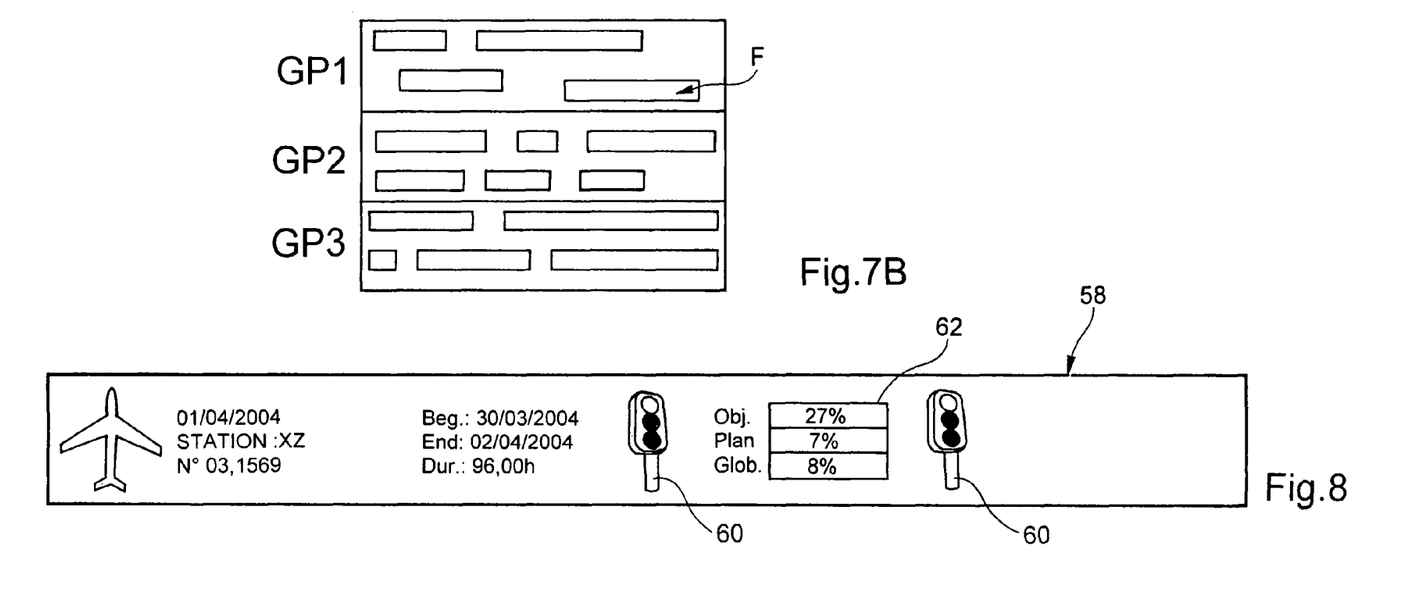

Always for the purpose of providing a synthesis view to the user, here it is proposed to make appear a banner 58 on top of the display screen, on giant screen 16 (or on another display screen). This banner includes information that summarizes the state of progress of the work for the production group in question.

From left to right, on a banner 58, one finds for instance the information appearing below.

First of all, and always in the case of building an aircraft, a logo, symbolized here by a plane, can show the name of the airline for which the plane is being built.

Next to the logo, on FIG. 8, there is a column showing a date as well as other information. For instance, the date is the date, and possibly the time, for updating the screen. Other information for instance is the work station reference and the identification number of the aircraft in question.

The next column contains information about the ongoing operations. In the example proposed appear the estimated beginning and the end dates of the operations as well as the total duration scheduled for these operations.

Banner 58 also includes, preferably, visual indicators 60. Here, a first indicator takes on the form of a three-colored light. This indicator for instance denotes the status of progress of the operations for the production group involved. Indicator 60 is for instance green when the ongoing operations are ahead or on schedule with respect to the actual schedule, orange when these operations are slightly behind schedule and red when there is a considerable delay for the operations with respect to the schedule.

To the right of visual indicator 60, there are cursors 62 that also denote here, in figures, the status of progress of the operations of the production group involved with respect to the balance performed. Cursors 62 are for instance indicators of progress of the work indicating for instance an objective (Obj.), a progress status with respect to the actual schedule (Plan) and an overall progress status (Glob.).

Banner 58 represented on FIG. 8 finally includes another visual indicator 60 in the form of a three-colored light. This second visual indicator 60 for instance is a risk indicator indicating for instance whether a delay is observed or not with respect to the critical path.

Needless to say, other indications can appear on banner 58. For instance, on this banner, one can also find scroll-down menus, a legend of various symbols used or else, a button permitting the display of such a legend. One can also find buttons to perform compression/decompression of the display performed, and/or a copy/printout of the screen, etc.

The proposed display management system also includes a function that permits opening an information bubble 64 when a cursor (not shown) moving around on the screen, controlled for instance by a mouse, is kept on an area of the screen. In the example shown on FIG. 9, information bubble 64 provides information regarding the selected tasks and shows for instance the name of this task, the number of hours assigned to it, its manufacturing order number, reference of the corresponding range, possible warnings, etc. . . . One can also provide that a bubble 64 appears when the cursor is positioned on the name of a manufacturing agent (AF1 to 6 on FIG. 9). Bubble 64 then includes information such as for instance the name of the applicable person, his trade, and possibly the place where he is on the balance.

Figure 9:
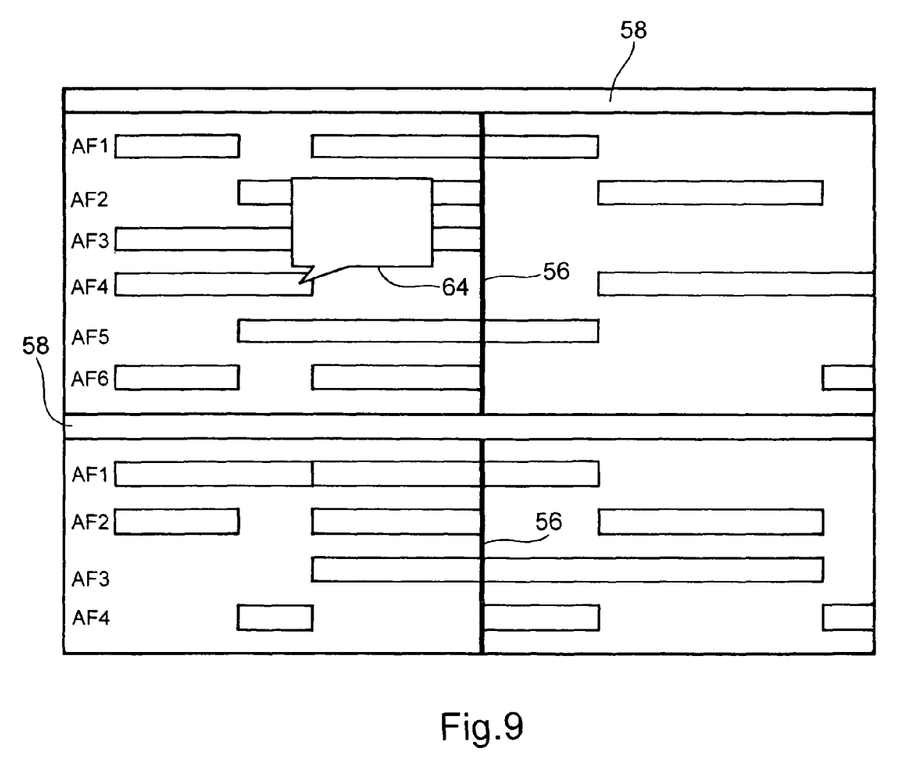

FIG. 9 illustrates a display example for which two windows are shown on the same screen. Each window then includes its banner 58 with the information for such window as well as its cursor 56. In this case, cursors 56 for the two windows are preferably aligned one with the other.

For a better command of the assembly operations as well as for a better anticipation of problems, one can access the source data used to perform the various displays and to produce tables with various forms (graph, diagram, bars, disk, etc. . . . ) These various data can be displayed on the screen or be output on paper. As such, graphic data are re-transcribed in the form of source data through a spreadsheet, such as an Excel spreadsheet (registered trademark), to facilitate analysis.

Such analyses can for instance be made before starting the various assembly operations so as to anticipate and prioritize the problems. Here, for instance, one can take into account supply problems or problems related to personnel management (absences, . . . ). During the assembly operations, such graphs and diagrams permit following the progress of the assembly operations. As such, the work station manager can better control operations for which he is responsible. Finally, once the assembly operations are performed, the graphs and diagrams permit analyzing the possible dysfunctions that might have happened. These can be analyzed to try, if possible, not to repeat them, or if this is not possible, to try and take them into account during a next scheduling.

All these functions described above permit making the device described more efficient because they permit direct access to the useful information upstream and downstream and during the assembly operations. This better management leads invariably to considerable time savings during assembly operations. Performance times can thus be easier kept and even reduced.

In areas Z3, Z4 and Z5, one finds the managers at the various levels of command, for the assembly shop. At each level of command, there is a computer (26, 28, 30) linked to network 10. Each of these computers permits for instance to view any information available on large screen 16. Also provided is the possibility of consulting from these computers, after identification, the information related to the various work stations as well as specific indicators defined according to their field of activity and the strategy of the company.

As an example, management can consult at any given time graphs that give the day by day history of advances/delays, previsions regarding delivery deadlines, information according a special work station, statistics concerning hours worked, attendance/absence, etc.

It is also provided to send warning messages to all levels of command. For instance, the system can provide that these messages are sent only by technical support agents (area Z2). Such warnings normally involve only serious problems that occur during manufacturing and that require intervention by upper management. One can also provide that when a warning message is sent by a manufacturing agent to an absent technical support agent, such message is automatically transferred to the higher command level (or to the next higher level present).

The system and the process described above permit improving communication in a manufacturing shop and as such achieve considerable gains in terms of production. This system permits generating warnings but also notifying the simple progress status of the tasks performed.

The manufacturing agent regularly inputs the progress status of his work. When a task is completed, the person in charge of checking the finished work is immediately notified. Once the inspection has been completed, the task is validated and appears as such on the balance.

Information circulates not only from the manufacturing agent to the technical support technicians but also from the technical support technicians to the manufacturing agents. As such, when a problem (item missing, technical problem, etc.) is signaled, the task involved is signaled by a specific color and an animation (blinking for instance). The problem is then handled by the quality agent of the technical support team. This handling of the problem is input. The animation disappears. The manufacturing agent thus knows that the problem is being handled. Subsequently, once the problem is solved, the technical support agent signals it to the system and the task returns to its original color, thus informing the manufacturing agent that the problem has been solved.

The warnings can also be generated by the system itself when differences appear between the balance initially foreseen and the performance of the tasks. These warnings are then handled for instance by the technical support areas.

All these examples show that a "fluid" communication is put in place using a system according to the invention. Information is easily accessible at any point of the manufacturing area. Presence of the giant screen at the level of a pass-by location, in the "heart" of the manufacturing area, permits to keep all agents of a production group informed of whatever goes on for the whole production group. As such, each agent is more involved in the group and does not consider himself as an isolated component. He is appreciated.

This invention is not limited to the various forms of performance described as non-limiting examples. It also involves any performance variant for the scope of the professional. As such, the means implemented in the description above are given as examples and other means can fulfill similar functions. It is understood that the size of these means (screens for instance) can also be adjusted to the application that is made of the invention.

With respect to the management of warnings, warnings other than those provided in the description can be implemented without falling outside the scope of the invention.

What is claimed as new and desired to be secured by Letters Patent of the United States is:

1. A production management system for a production unit for which a schedule of tasks to be accomplished is set up and stored in a memory in a central management device, the system comprising:
   individual electronic devices each associated with an operator;
   control stations comprising a computer and a control screen;
   an operation screen displaying the schedule of tasks to be accomplished by a plurality of operators and being visible to each of the plurality of operators; and
   a network linking the individual electronic devices, the operation screen, and the control stations to the central management device, wherein
   tasks accomplished and problems encountered during an implementation of the tasks by the operator are input by a respective operator into each of the individual electronic devices and transmitted to the central management device,
   the central management device compares data inputted into the individual electronic devices by the operators and the schedule of tasks to be accomplished,
   the central management device generates a warning when the central management device detects a discrepancy based on the comparison between the data inputted by the operators and the schedule of tasks to be accomplished that exceeds a predetermined and memorized threshold, and transmits the warning to the individual electronic devices, the operation screen, and the control stations,
   at least a part of the individual electronic devices, the operation screen, and the control stations display the warning involving the respective operator associated with one of the individual electronic devices and other operators, the operation screen displays a two-dimensional graph of the schedule of tasks, and a variable scale is used for one axis of the graph in which successive values incrementing the one axis are not equally distributed, the variable scale is used for a time axis and present tasks are displayed larger than tasks performed in the past or future, and sides of the variable scale are compressed based on a logarithmic function.

2. The system according to claim 1, wherein the individual electronic devices are wireless portable devices of a portable computer type.

3. The system according to claim 1, wherein the central management device permits modification of the memorized schedule of tasks.

4. The system according to claim 1, wherein the operation screen includes a plurality of screens.

5. The system according to claim 1, wherein the operation screen comprises scrolling devices of an image illustrating the schedule of tasks.

6. The system according to claim 1, wherein the variable scale is larger in a center of the screen and smaller towards edges of the screen.

7. The system according to claim 1, wherein the operation screen permits a display of a cursor and is associated with a control device for moving the cursor.

8. The system according to claim 7, further comprising an additional information display when the cursor is positioned on a particular area of the screen.

9. The system according to claim 1, wherein the operation screen displays tasks in the form of PERT diagrams.

10. The system according to claim 1, wherein the operation screen has a size of 4 m×2 m.

11. The system according to claim 1, wherein the operation screen displays dialog boxes generated by operators using the individual electronic devices or the control stations.

12. The system according to claim 1, wherein the central management device automatically generates and transmits the warning.

13. A production management system for a production unit for which a schedule of tasks to be accomplished is set up and stored in a memory in a central management device, the system comprising:

individual electronic devices each associated with an operator; control stations comprising a computer and a control screen;

an operation screen displaying the schedule of tasks to be accomplished by a plurality of operators and being visible to each of the plurality of operators; and a network linking the individual electronic devices, the operation screen, and the control stations to the central management device, wherein tasks accomplished and problems encountered during an implementation of the tasks by the operator are input by a respective operator into each of the individual electronic devices and transmitted to the central management device, the central management device compares data inputted into the individual electronic devices by the operators and the schedule of tasks to be accomplished, the central management device generates a warning when the central management device detects a delay based on the comparison between the data inputted by the operators and the schedule of tasks to be accomplished that exceeds a predetermined and memorized threshold, and transmits the warning to the individual electronic devices, the operation screen, and the control stations, at least a part of the individual electronic devices, the operation screen, and the control stations display the warning involving the respective operator associated with one of the individual electronic devices and other operators, the operation screen displays a two-dimensional graph of the schedule of tasks, and a variable scale is used for one axis of the graph, the variable scale is larger in a center of the screen and smaller towards edges of the screen such that tasks performed during an entire duration of the scale are all displayed on the operation screen, the variable scale is used for a time axis, the edges of the variable scale are compressed based on a logarithmic function, the control stations belong to at least two levels of a production hierarchy, and a warning generated at one level of the hierarchy is forwarded by the system to a higher or lower level of the hierarchy.

14. The system according to claim 13, wherein the central management device automatically generates and transmits the warning.

* * * * *